United States Patent
Yuan et al.

(10) Patent No.: US 8,253,068 B2
(45) Date of Patent: Aug. 28, 2012

(54) METHOD OF CUTTING BULK AMORPHOUS ALLOY

(75) Inventors: Xiao-Bo Yuan, Shenzhen (CN); Yi-Min Jiang, Shenzhen (CN); Yang-Yong Li, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 246 days.

(21) Appl. No.: 12/815,554

(22) Filed: Jun. 15, 2010

(65) Prior Publication Data

US 2011/0253689 A1   Oct. 20, 2011

(30) Foreign Application Priority Data

Apr. 15, 2010 (CN) .......................... 2010 1 0147749

(51) Int. Cl.
- B23K 26/00 (2006.01)
- B23K 26/14 (2006.01)
- B23K 26/16 (2006.01)
- C22C 14/00 (2006.01)
- C22C 16/00 (2006.01)
- C22C 27/00 (2006.01)

(52) U.S. Cl. ......... 219/121.72; 219/121.66; 219/121.67; 219/121.84; 148/421; 420/423

(58) Field of Classification Search ............. 219/121.66, 219/121.67, 121.72, 121.184; 148/421; 420/423
See application file for complete search history.

(56) References Cited

U.S. PATENT DOCUMENTS

| | | | | |
|---|---|---|---|---|
| 4,638,145 A * | 1/1987 | Sakuma et al. | .......... | 219/121.78 |
| 4,820,897 A * | 4/1989 | Lefevre | .................... | 219/121.67 |
| 5,052,013 A * | 9/1991 | Putnam | .......................... | 372/97 |
| 5,164,567 A * | 11/1992 | Gettemy | ................... | 219/121.72 |
| 5,662,822 A * | 9/1997 | Tada et al. | ................. | 219/121.67 |
| 5,672,211 A * | 9/1997 | Mai et al. | ........................ | 118/726 |
| 6,388,231 B1 * | 5/2002 | Andrews | ................... | 219/121.69 |
| 6,771,490 B2 * | 8/2004 | Peker et al. | ............... | 361/679.34 |
| RE39,001 E * | 3/2006 | Lundquist et al. | ........ | 219/121.72 |
| 7,023,001 B2 * | 4/2006 | Cournoyer et al. | ......... | 250/492.1 |
| 7,776,720 B2 * | 8/2010 | Boyle et al. | .................... | 438/463 |
| 2006/0097430 A1 * | 5/2006 | Xiaochun et al. | ............... | 264/400 |
| 2006/0208257 A1 * | 9/2006 | Branz et al. | ..................... | 257/49 |
| 2007/0003782 A1 * | 1/2007 | Collier | .......................... | 428/621 |
| 2007/0134833 A1 * | 6/2007 | Ikemoto et al. | ................. | 438/33 |
| 2007/0212510 A1 * | 9/2007 | Hieslmair et al. | ........... | 428/40.1 |
| 2010/0102045 A1 * | 4/2010 | Durr | ........................ | 219/121.72 |
| 2010/0308361 A1 * | 12/2010 | Beeson et al. | .................. | 257/98 |
| 2011/0094094 A1 * | 4/2011 | Li et al. | ........................ | 29/623.5 |

* cited by examiner

*Primary Examiner* — Ida M Soward
(74) *Attorney, Agent, or Firm* — Altis Law Group, Inc.

(57) ABSTRACT

A method of cutting bulk amorphous alloy includes: positioning a target cutting path of the bulk amorphous alloy in an atmosphere of an inert gas; cutting the target cutting path to form a cut surface using a pulsed laser; and removing a plurality of burrs located on the cut surface produced during the cut.

10 Claims, 12 Drawing Sheets

METHOD OF CUTTING BULK AMORPHOUS ALLOY

BACKGROUND

1. Technical Field

The present disclosure relates to cutting of materials, and particularly, to a method of cutting bulk amorphous alloy using a laser.

2. Description of Related Art

Amorphous alloys, commonly referred to as metallic glass, are formed by solidification of alloy melts by cooling the alloy to a temperature below its glass transition temperature (Tg) before appreciable homogeneous nucleation and crystallization has occurred. More recently, a number of amorphous alloys with critical cooling rates (Rc) low enough to allow the formation of amorphous structure in thicker layers (those over 1 millimeter) have been produced. These are known as bulk amorphous alloys, or bulk metallic glass. Because the bulk amorphous alloys provide superior magnetic, mechanical, chemical, and other properties in comparison with the crystalline metals, many alloy compositions which can form an amorphous phase, such as Fe systems, Ni systems, Co systems, Al systems, Zr systems, and Ti systems, have been developed.

A variety of devices or components produced from Zr-based bulk amorphous alloy, such as golf clubs and hinges for mobile phones, has been developed. If the shape of the amorphous alloy component is relatively complicated, casting methods for fabrication are ineffective. Accordingly, it is necessary to cut the amorphous alloy component into a predetermined shape. Unfortunately, since amorphous alloys are extremely hard and brittle at room temperature and tend to fail suddenly when loaded in tension, conventional techniques that are used for cutting crystalline metals, such as die punching or wire cutting, may not be applicable to cut the amorphous alloys.

It is possible to cut completely through amorphous alloy using lasers. Referring to FIG. 12, a workpiece of Zr-based bulk amorphous alloy cut by a frequently used laser cutting method is shown. As seen, a high energy density of the focused laser tends to cause local vaporization of the workpiece, and molten or vaporized material tends to run or re-condense. This inevitably leads to the formation of cutting defects, especially burrs on a cut kerf. In addition, the amorphous alloy may crystallize to a crystalline state during the cutting process, so that the benefits of the amorphous state of amorphous alloy are lost.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the views.

DETAILED DESCRIPTION

Figure 1:
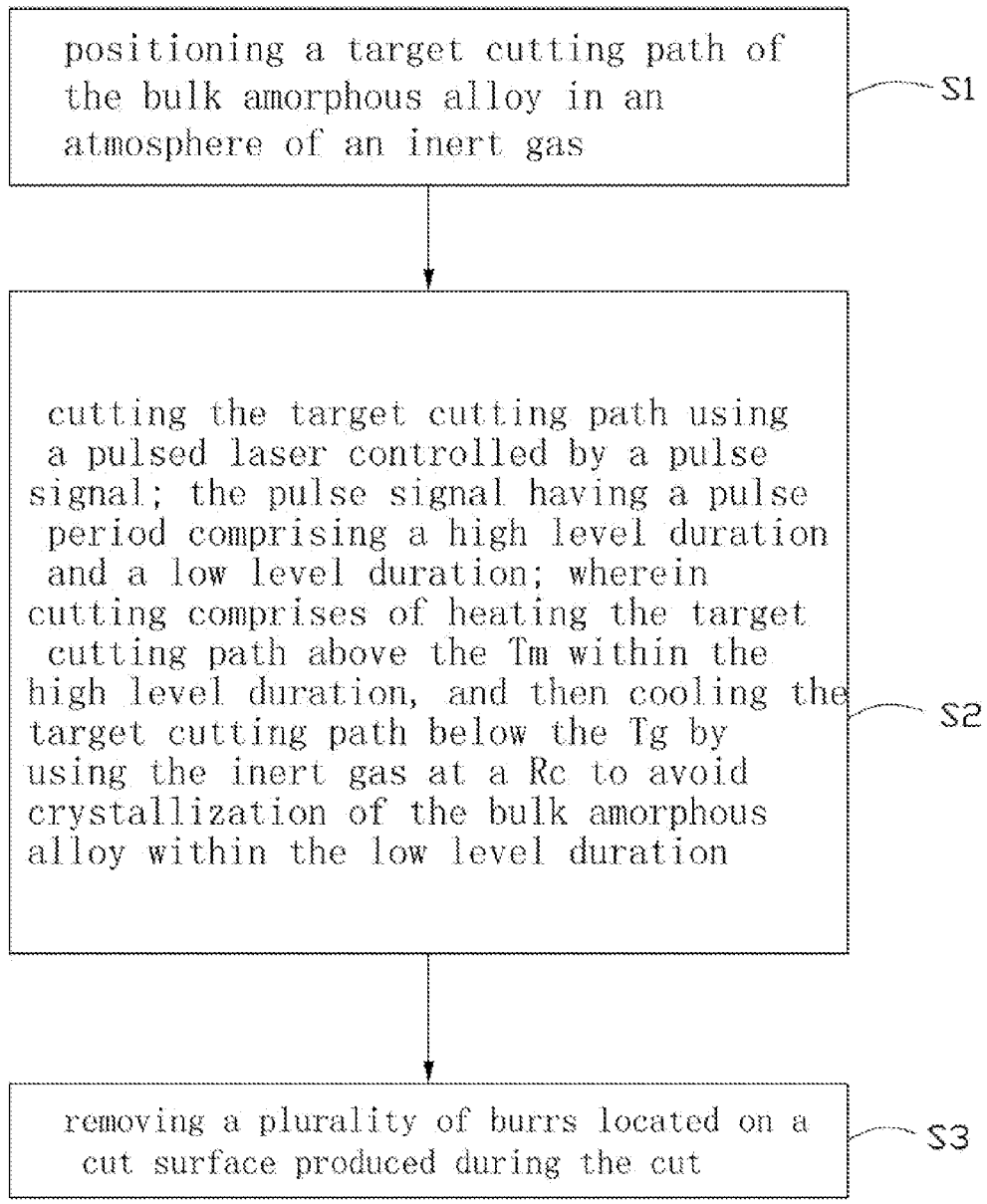
FIG. 1 is a flowchart of an embodiment of a cutting method.

FIG. 1 shows an embodiment of a method for cutting a bulk amorphous alloy described as follows.

Figure 2:
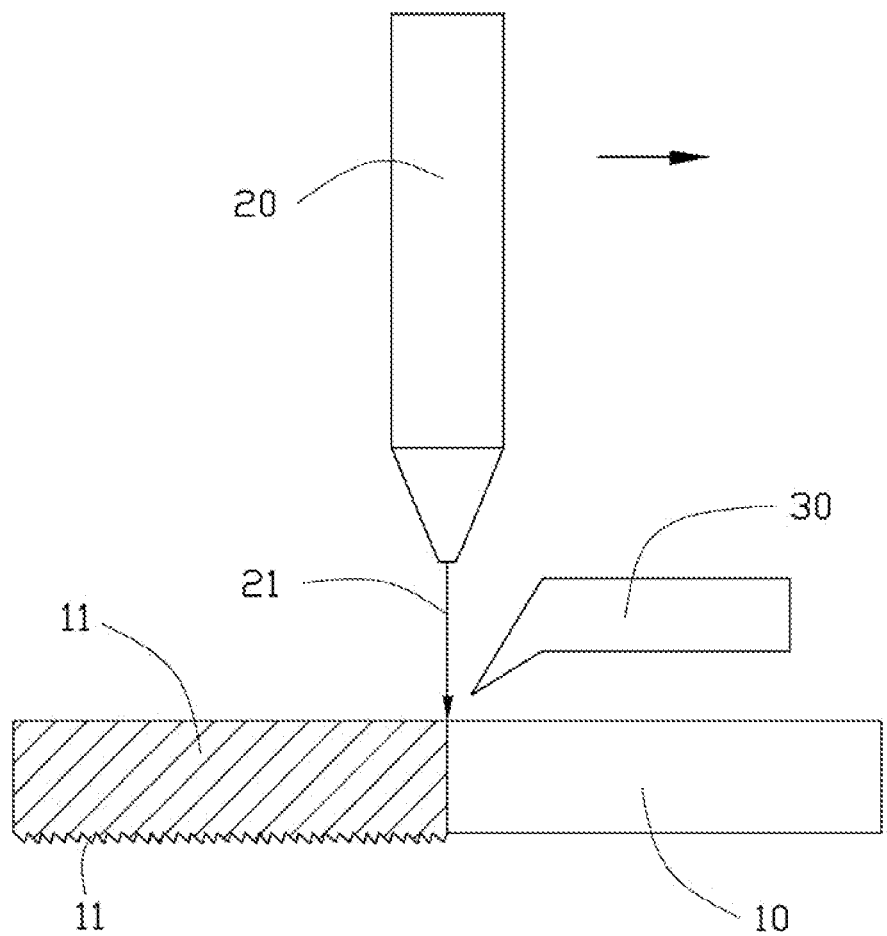
FIG. 2 is a schematic side view of a bulk amorphous alloy undergoing the cutting method of the FIG. 1.

In step S1, referring also to FIG. 2, a thin metal sheet 10 is provided and positioned beneath a laser generator 20 and a protective gas supply device 30. The sheet 10 is made of a Zr-based bulk amorphous alloy such as Zr—Cu—Al—Ni, Zr—Cu—Al—Ni—Ti, Zr—Cu—Al—Ni—Nb, Zr—Cu—Ni—Ti—Be, Zr—Cu—Al—Ni—Be, or Zr—Cu—Al—Ti—Be. The Zr-based bulk amorphous alloy has a melting temperature (Tm), a temperature at which the alloy changes from solid to liquid state, a critical cooling rate (Rc), the least quenching rate at which a melt of the bulk amorphous alloy can be quenched to its glassy state, and a glass transition temperature (Tg), which is the temperature corresponding to a viscosity of the bulk amorphous alloy of about $10^{13}$ poise. A thickness of the sheet 10 is in a range from about 0.2 millimeter (mm) to about 10 mm. The laser generator 20 may be a $CO_2$ laser generator or a Nd:YAG laser generator, configured to emit a pulsed laser 21. The protective gas supply device 30 is configured to supply an inert gas such as argon, helium, or nitrogen. Before the cutting starts, the protective gas supply device 30 is turned on. A target cutting path of the sheet 10, which is to be cut, is positioned in the atmosphere of the inert gas.

Figure 3:
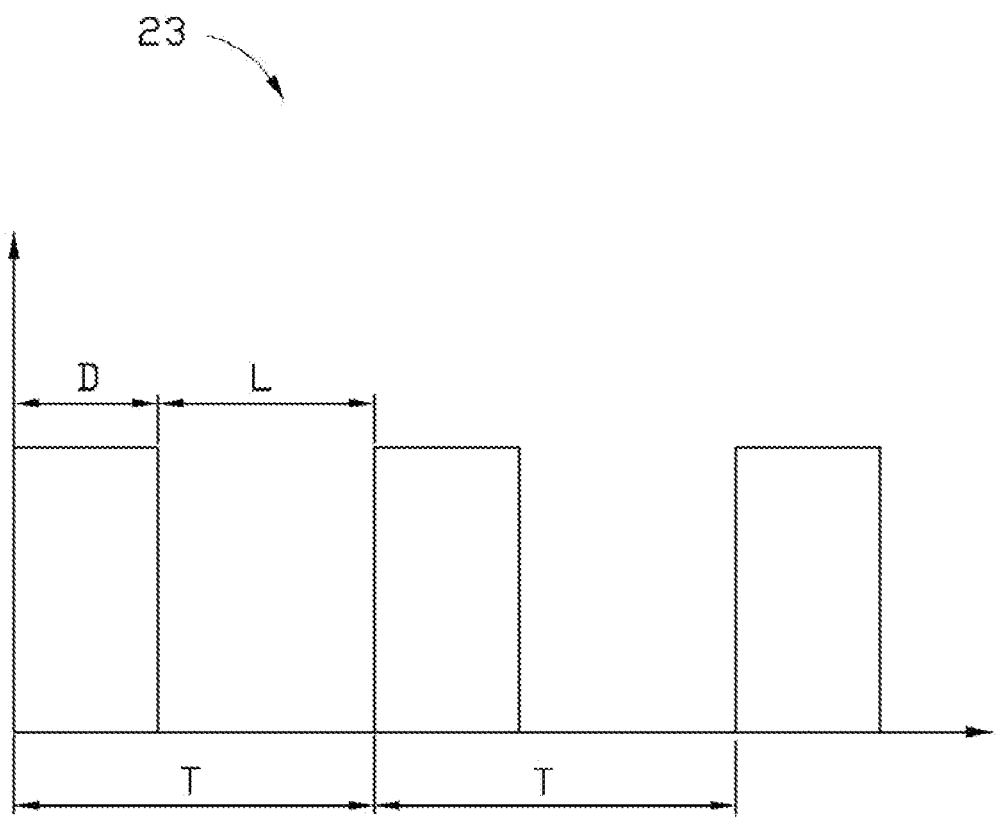
FIG. 3 is a diagram of a pulse signal of a pulsed laser used in the cutting method of FIG. 1.
Figure 4:
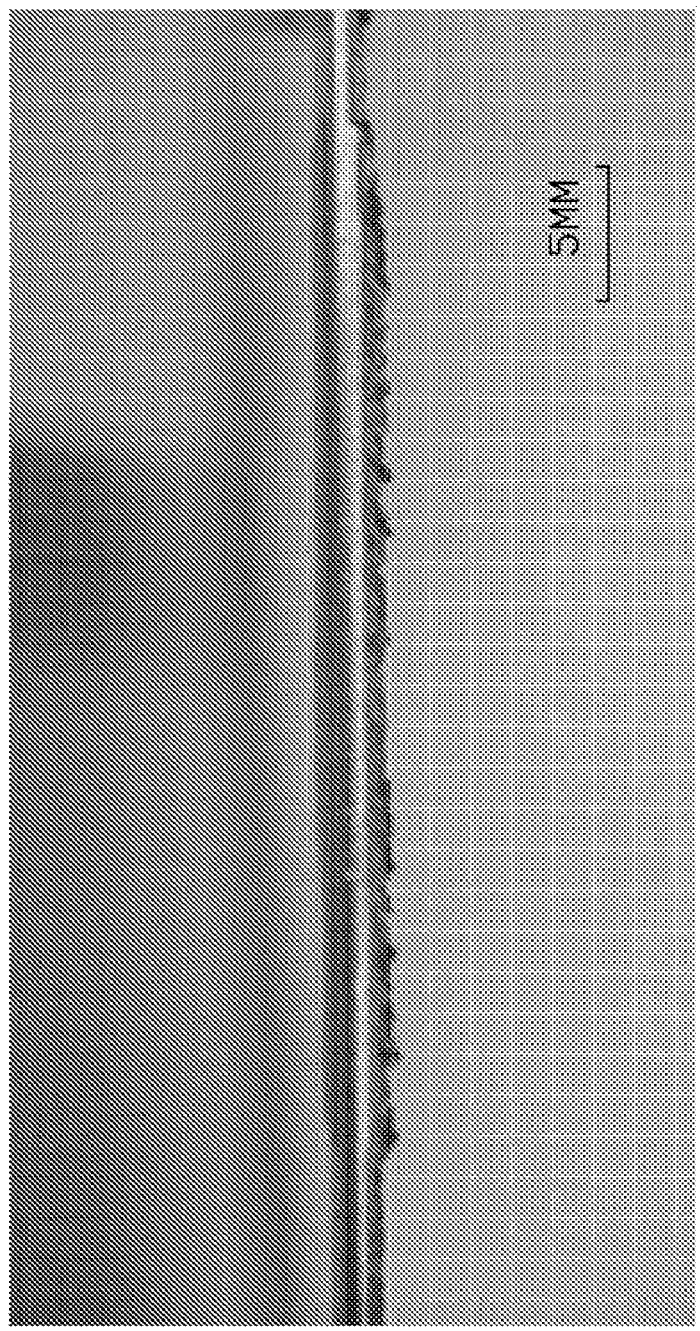
FIG. 4 through FIG. 10 are a plurality of photographs showing a plurality of cut surfaces of examples 1~7 of the bulk amorphous alloy of FIG. 1.
Figure 5:
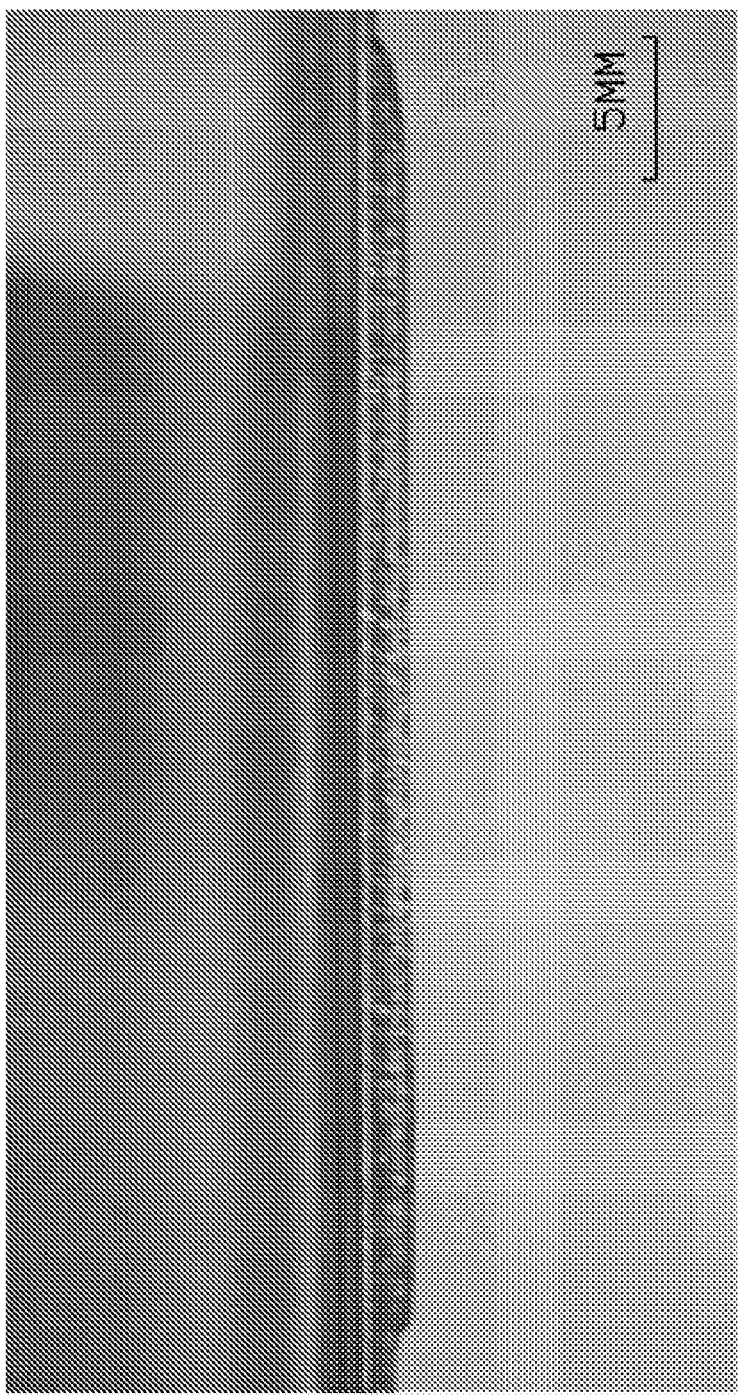
Figure 6:
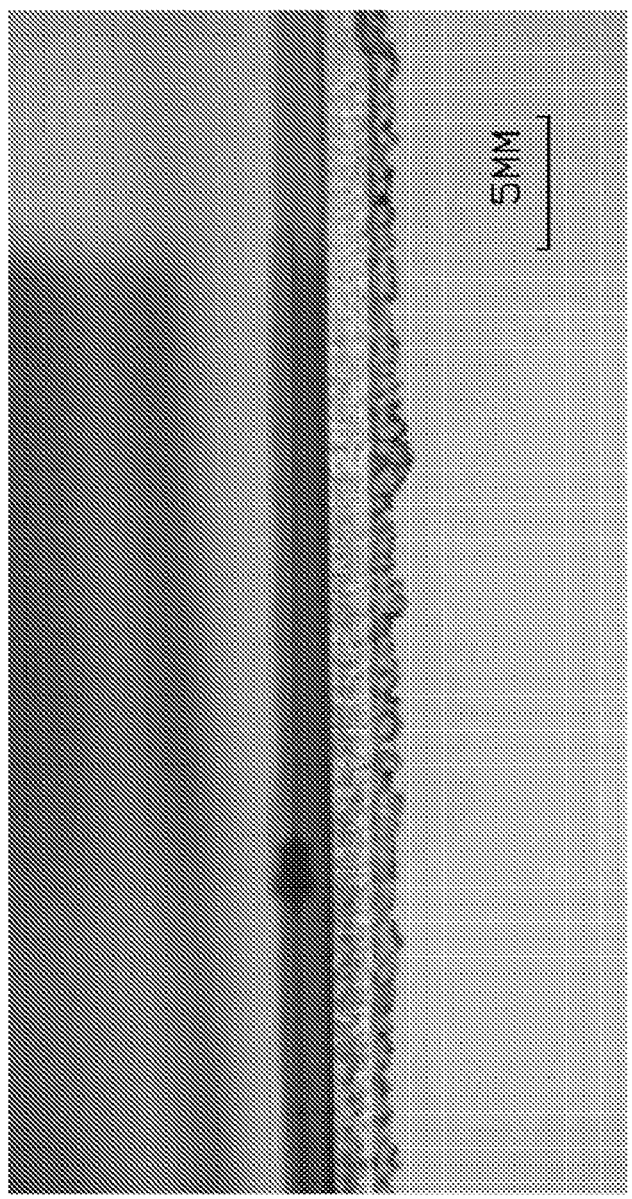
Figure 7:
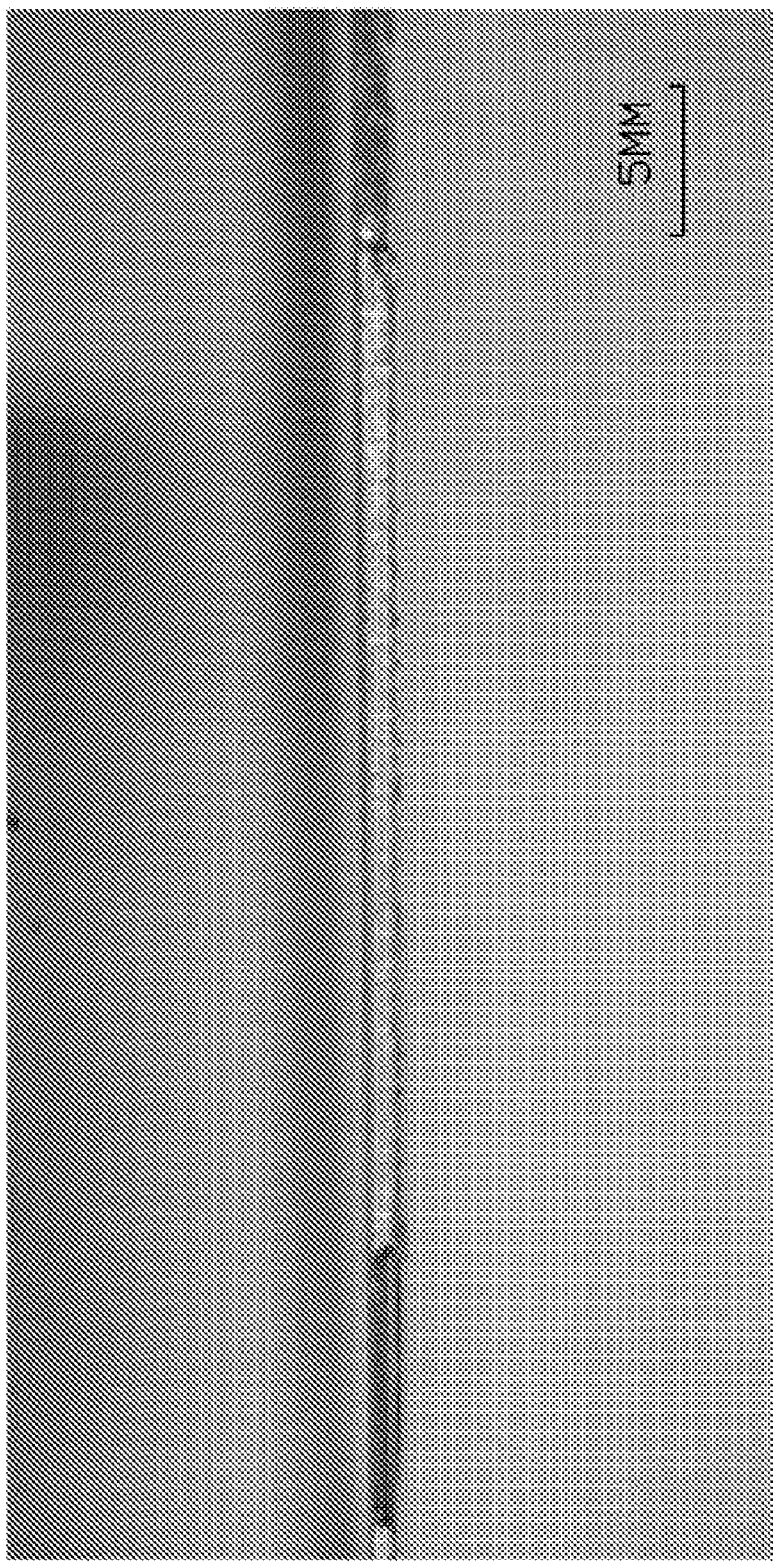
Figure 8:
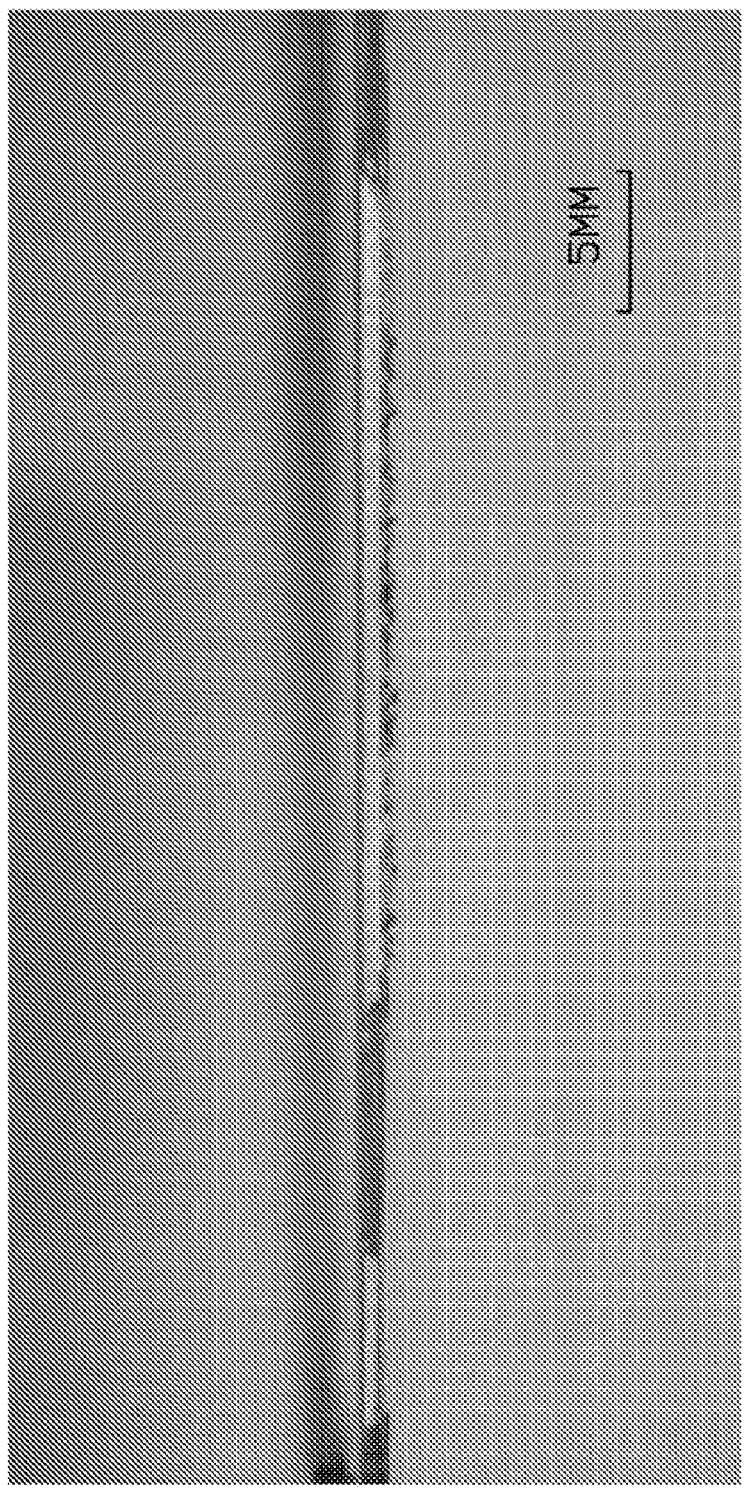
Figure 9:
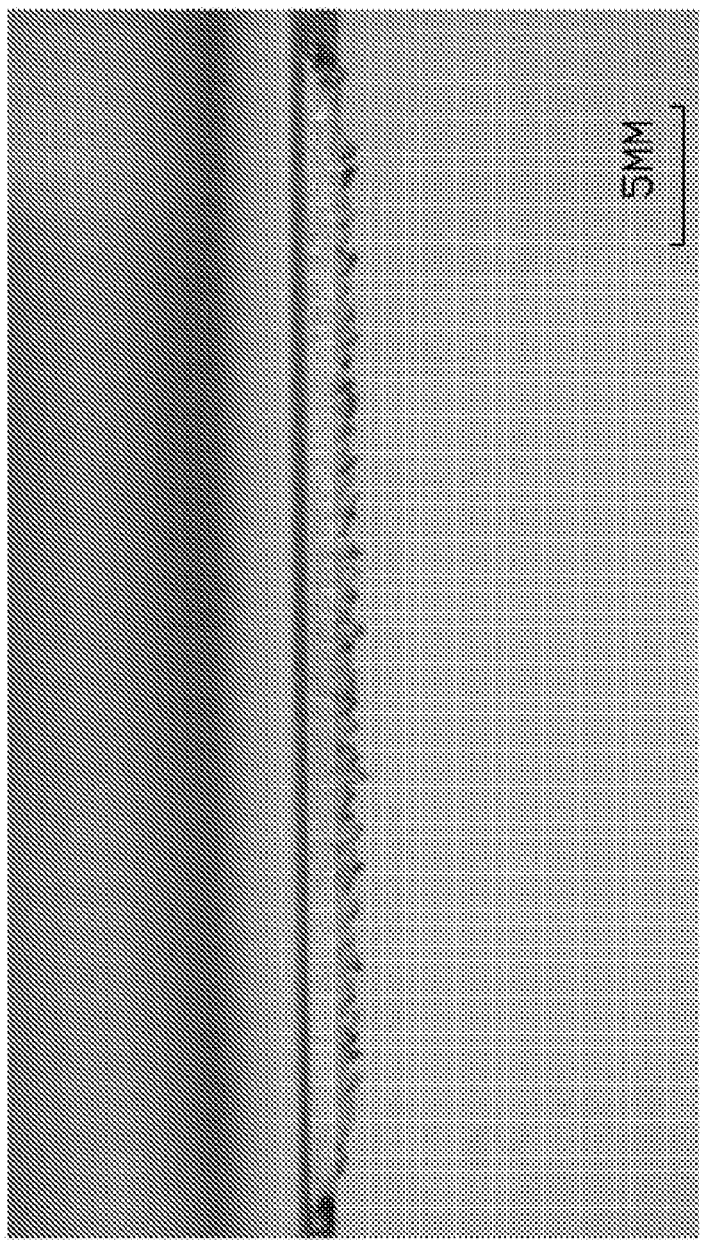
Figure 10:
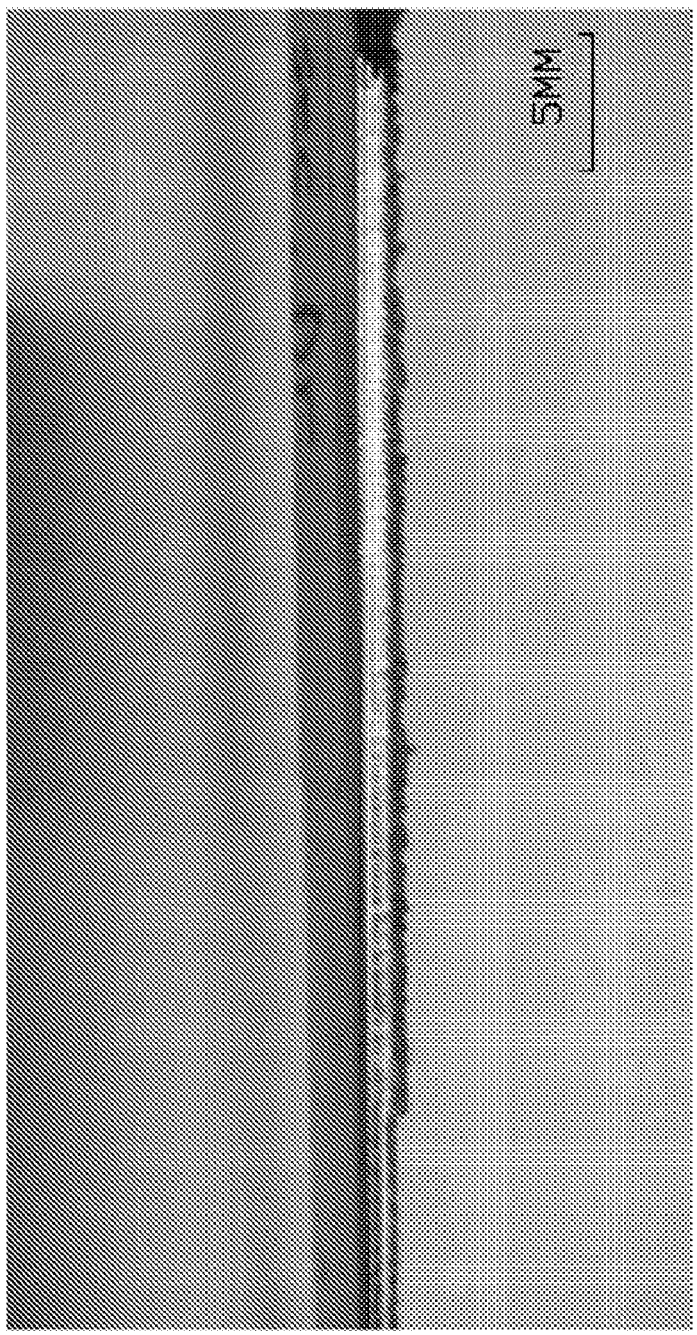

In step S2, the laser 21 is projected toward the sheet 10 and moves along a line to cut the sheet 10 along the target cutting path and forms a cut surface 11. The laser 21 is controlled by a pulsed signal 23 generated by the laser generator 20. FIG. 3 shows a timing diagram of the pulse signal 23. As shown, the pulse signal 23 is substantially a square wave signal, which has a pulse period represented by T. The pulse period T includes a high level duration represented by D, which is often referred as a "pulse width", and a low level duration represented by L, which is often referred as a "pulse interval". Accordingly, T=D+L. During the cutting, specifically in one pulse period, the target cutting path of the sheet 10 is heated by the laser 21 above the Tm within the high level duration D. The inert gas flows substantially parallel to the laser 21 and blows the excess molten or vaporized material to an edge of the cut surface 11, in which a plurality of burrs 12 is formed accordingly. The target cutting path is then cooled or quenched below the Tg by using the inert gas at a cooling rate exceeding the Rc within the low level duration, such that the cut surface 11 remains amorphous after the cutting. In the illustrated embodiment, a maximum power of the pulsed laser 21 is in a range from about 0.2 kW to about 5 kW. A frequency of the pulsed laser is in a range from about 100 Hz to about 300 Hz. The high level duration D is in a range from about 0.2 µs to about 1.5 µs. A cutting rate exceeds 3 mm/s.

In step S3, the burrs 12 are removed, and a smooth cut surface 11 having higher dimensional accuracy is obtained. The removal of the burrs 12 can be performed by mechanical polishing or electrochemical polishing.

Table 1 shows the parameters of the cutting method for seven identical sheets (Examples 1~7) made of a Zr—Cu—Al—Ni—Nb amorphous alloy. FIGS. 4~10 show the cut surfaces of Examples 1~7 performed by the cutting method from Table 1. The cutting quality of each examples is evaluated by testing a roughness and a burr status of the cut surface. The roughness is evaluated by a rating given by a person performing the evaluation, wherein 1 represents the worst and 5 represents the best) given to each example based on the observed smoothness. The burr status is also evaluated by a rating of 1 to 5 based on a quantity and an average length of the burrs.

TABLE 1

Cutting Parameters and Cut Quality of Examples

| Parameter | Example 1 | Example 2 | Example 3 | Example 4 | Example 5 | Example 6 | Example 7 |
|---|---|---|---|---|---|---|---|
| thickness (mm) | 0.2 | 0.2 | 0.2 | 5 | 5 | 10 | 10 |
| Maxi0mum power (KW) | 0.2 | 0.2 | 0.2 | 3 | 3 | 3 | 5 |
| cutting rate (mm/s) | 32 | 20 | 10 | 20 | 20 | 20 | 20 |
| high level duration (μs) | 0.2 | 0.2 | 0.2 | 1 | 1 | 1.5 | 1.5 |
| frequency (Hz) | 100 | 100 | 100 | 180 | 250 | 300 | 300 |
| roughness | 5 | 3 | 2 | 3 | 4 | 3 | 5 |
| burr status | 2 | 2 | 2 | 5 | 4 | 3 | 4 |

As shown in FIGS. 4~10, and described in Table 1, it can be concluded that a roughness of the sheet 10 may be increased with increased cutting rate, that the roughness of the sheet 10 may be decreased with increased frequency; however, the numbers or average length of the burrs may increase, and the roughness and burrs may both be decreased with increased maximum power.

Figure 11:
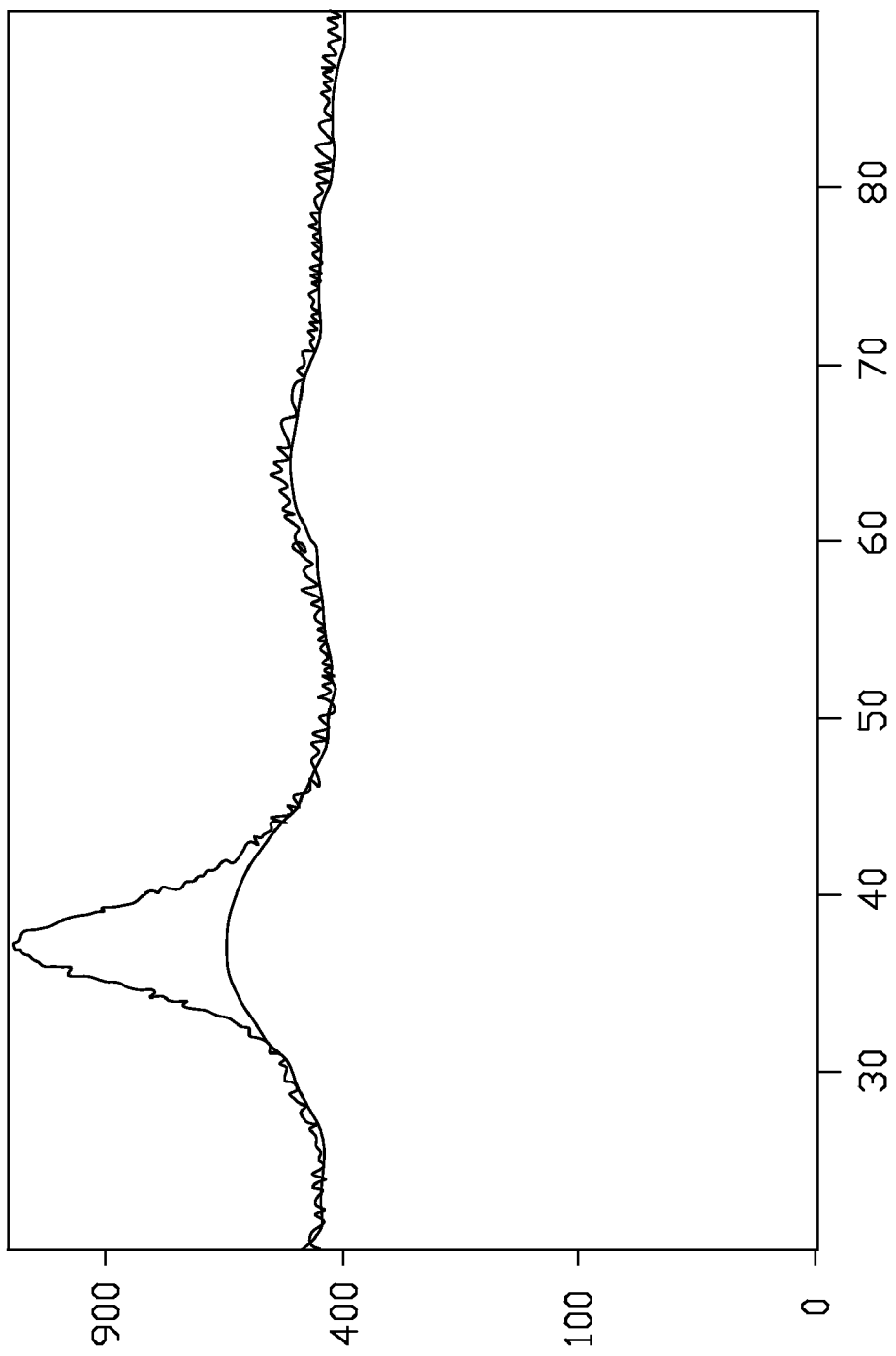
FIG. 11 is an X-ray diffraction (XRD) graph of a cut surface of example 4 of the bulk amorphous alloy of FIG. 1.
Figure 12:
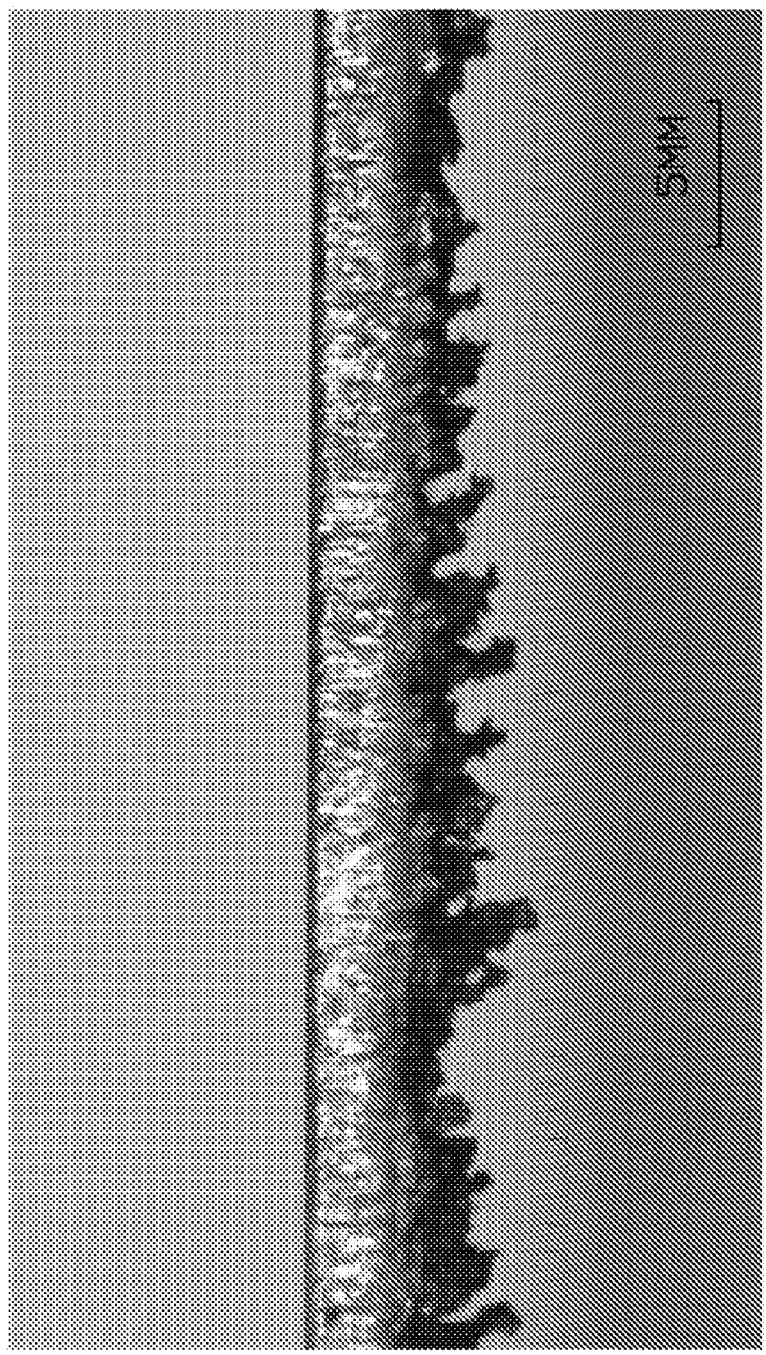
FIG. 12 is a photograph showing a cut surface of a bulk amorphous alloy having undergone cutting.

FIG. 11 is an x-ray diffraction (XRD) pattern of a cutting surface of example 4 in Table 1. The diffraction patterns show no sharp diffraction peaks, which are indicative of crystalline or quasi-crystalline phases.

The method as disclosed provides a lower cost and more effective technique for cutting amorphous metal sheet to a desired final shape without losing the special features of the amorphous state and with a economical energy input requirement. In addition, higher dimensional accuracy (±0.1 mm) and faster cutting speed are also provided.

It is believed that the present embodiments and their advantages will be understood from the foregoing description, and it will be apparent that various changes may be made thereto without departing from the spirit and scope of the disclosure or sacrificing all of its material advantages.

What is claimed is:

1. A method of cutting bulk amorphous alloy, comprising:
    positioning a target cutting path of the bulk amorphous alloy in an atmosphere of an inert gas;
    cutting the target cutting path using a pulsed laser controlled by a pulse signal; the pulse signal having a pulse period comprising a high level duration and a low level duration; wherein cutting comprises: heating the target cutting path above the melting temperature (Tm) within the high level duration, and then cooling the target cutting path below the glass transition temperature (Tg) by using the inert gas at a cooling rate exceeding a critical cooling rate (Rc) to avoid crystallization of the bulk amorphous alloy within the low level duration; and
    removing a plurality of burrs located on a cutting surface produced during the cut.

2. The method of claim 1, wherein the inert gas flows substantially parallel to the pulsed laser, and the burr is formed on an edge of the cut surface.

3. The method of claim 1, wherein the bulk amorphous alloy is Zr—Cu—Al—Ni, Zr—Cu—Al—Ni—Ti, Zr—Cu—Al—Ni—Nb, Zr—Cu—Ni—Ti—Be, Zr—Cu—Al—Ni—Be, or Zr—Cu—Al—Ti—Be.

4. The method of claim 2, wherein a thickness of the target cutting path is in a range from about 0.2 mm to about 10 mm.

5. The method of claim 4, wherein a maximum power of the pulsed laser is in a range from about 0.2 kW to about 5 kW.

6. The method of claim 4, wherein a cutting rate exceeds 3 mm/s.

7. The method of claim 4, wherein a frequency of the pulsed laser is in a range from about 100 Hz to about 300 Hz.

8. The method of claim 4, wherein the high level duration is in a range from about 0.2 μs to about 1.5 μs.

9. The method of claim 1, wherein the inert gas is argon, helium, or nitrogen.

10. The method of claim 1, wherein the burr is removed by mechanical polishing or electrochemical polishing.

* * * * *